United States Patent
Bright-Thomas

(10) Patent No.: US 11,290,680 B1
(45) Date of Patent: Mar. 29, 2022

(54) HIGH-FIDELITY FREEZE-FRAME FOR PRECISION VIDEO COMMUNICATION APPLICATIONS

(71) Applicant: Cisco Technology, Inc., San Jose, CA (US)

(72) Inventor: Paul G. Bright-Thomas, Wokingham (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/034,569

(22) Filed: Sep. 28, 2020

(51) Int. Cl.
*H04N 7/14* (2006.01)
*H04L 65/60* (2022.01)
*H04N 5/45* (2011.01)
*H04N 7/15* (2006.01)
*H04N 7/01* (2006.01)

(52) U.S. Cl.
CPC ........... *H04N 7/147* (2013.01); *H04L 65/607* (2013.01); *H04N 5/45* (2013.01); *H04N 7/0117* (2013.01); *H04N 7/15* (2013.01)

(58) Field of Classification Search
CPC ... H04N 7/14; H04N 7/01; H04N 7/15; H04L 29/06; H04L 5/45
USPC ............................................. 348/14.01–14.16
See application file for complete search history.

(56) References Cited

U.S. PATENT DOCUMENTS

| | | | |
|---|---|---|---|
| 6,215,515 B1* | 4/2001 | Voois | G06T 9/007 348/14.01 |
| 2014/0313281 A1* | 10/2014 | Graff | H04L 65/605 348/14.09 |
| 2014/0376609 A1* | 12/2014 | Barkley | H04N 7/15 375/240.02 |
| 2017/0237784 A1* | 8/2017 | Maistri | H04L 65/1083 348/14.02 |
| 2018/0352089 A1* | 12/2018 | Garrido | H04L 65/1083 |
| 2019/0098347 A1* | 3/2019 | Chaugule | H04N 21/6587 |
| 2019/0182454 A1* | 6/2019 | Berger | G06T 11/001 |
| 2019/0215484 A1* | 7/2019 | Power | H04N 7/15 |
| 2019/0238794 A1* | 8/2019 | Barkley | H04N 7/14 |
| 2019/0306273 A1* | 10/2019 | Vismonte | H04L 65/4084 |

OTHER PUBLICATIONS

Shrikant Acharya, "Design Of A Freeze-Frame Coder", SPIE. Digital Library, Jun. 3, 1987, Abstract, 4 pages.

(Continued)

*Primary Examiner* — Melur Ramakrishnaiah
(74) *Attorney, Agent, or Firm* — Edell, Shapiro & Finnan, LLC

(57) ABSTRACT

Techniques are provided by which a receiver of a video stream signals to the sender to freeze the video input at a certain frame, and the sender responds by adapting its encoding methods to progressively improve the quality of the sent static image. A method includes receiving at a first device a first freeze-frame request initiated by the second device. The first freeze-frame request indicates that a user of the second device requests a high-fidelity freeze-frame of a first frame of the encoded video stream from the first device. A first sequence of encoded video frames of the first frame is generated for a high-fidelity freeze-frame. Each encoded video frame of the first sequence is of progressively higher fidelity of the first frame.

20 Claims, 9 Drawing Sheets

(56) References Cited

OTHER PUBLICATIONS

Rex, S., "Computer-Based Teleconferencing Begins Migration into the Office.", Communications News, Feb. 1, 1985, ISSN: 0010-3632, 5 pages.
VC Warehouse LTD., "Medical Video Conferencing", retrieved from Internet Aug. 1, 2020, 3 pages. https://www.vcwarehouse.com/category-s/1907.htm.
Sequence Health, "Telehealth Services | Real-Time Online Patient Appointment", retrieved from Internet Aug. 1, 2020, 6 pages. https://sequencehealth.com/our-solutions/telehealth-services.
International Telecommunication Union, H.261, "Codec for Audio-visual Services At n × 384 kbit/s", Series H: Audiovisual and Multimedia Systems, Blue Book, Fascicle III.6, Nov. 1988, 14 pages.
International Telecommunication Union, "Video coding for low bit rate communication", Series H: Audiovisual and Multimedia Systems, Infrastructure of audiovisual services—Coding of moving videoITU-T Recommendation H.263, Feb. 1998, 167 pages.
International Telecommunication Union, "Video Codec for Audio-visual Services at p × 64 kbits", H.261, Mar. 1993, 29 pages.
De Rivaz et al., The Alliance for Open Media, "AV1 Bitstream & Decoding Process Specification", Jan. 8, 2019, 681 pages.
International Telecommunication Union, "High Efficiency Video Coding", H.265, Nov. 2019, 712 pages.
International Telecommunication Union, "Advanced Video Coding for Generic Audiovisual Services", H.264, Jun. 2019, 836 pages.
International Telecommunication Union, "Versatile Video Coding", H.266, Aug. 2020, 516 pages.

* cited by examiner

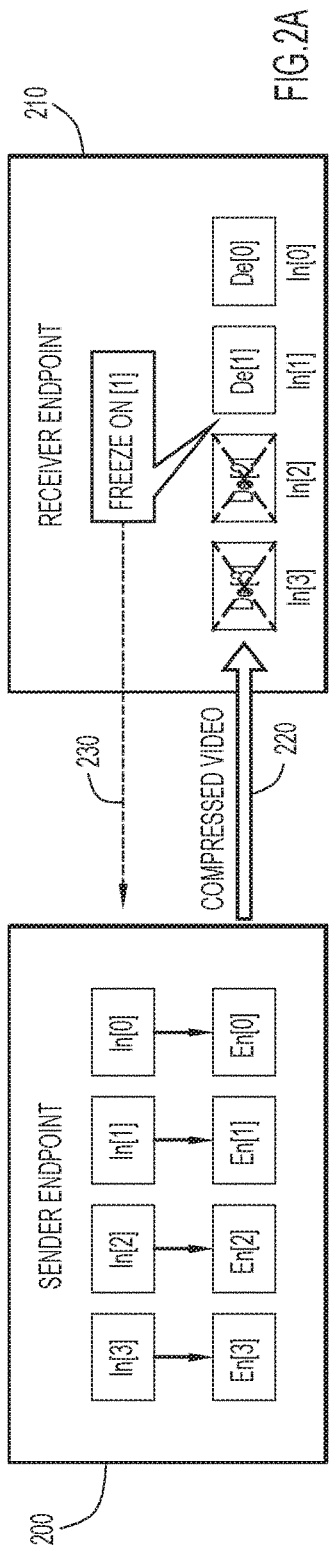
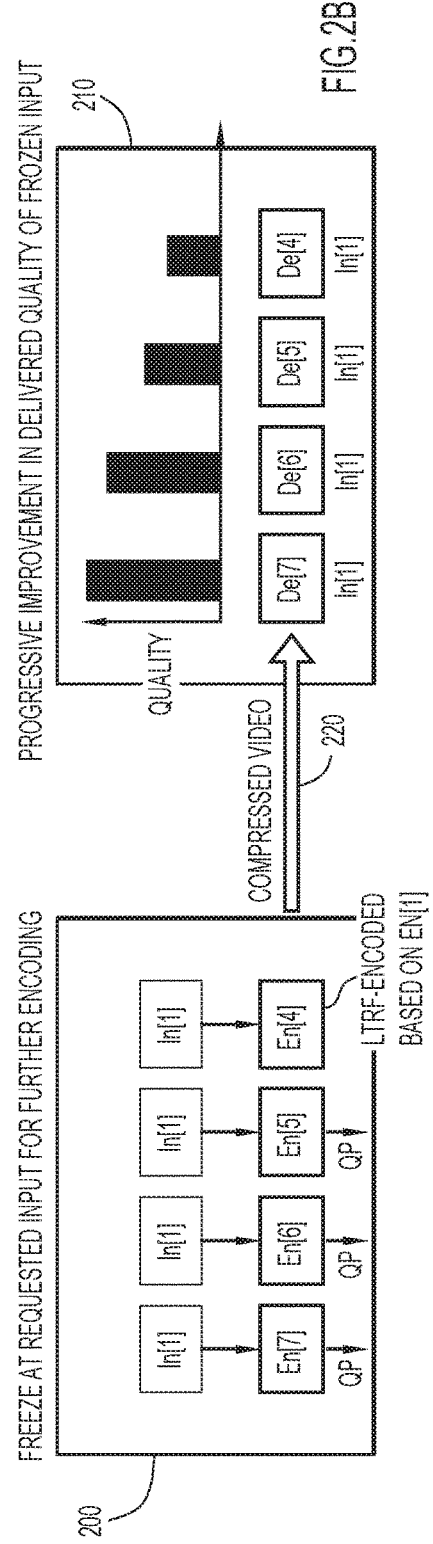
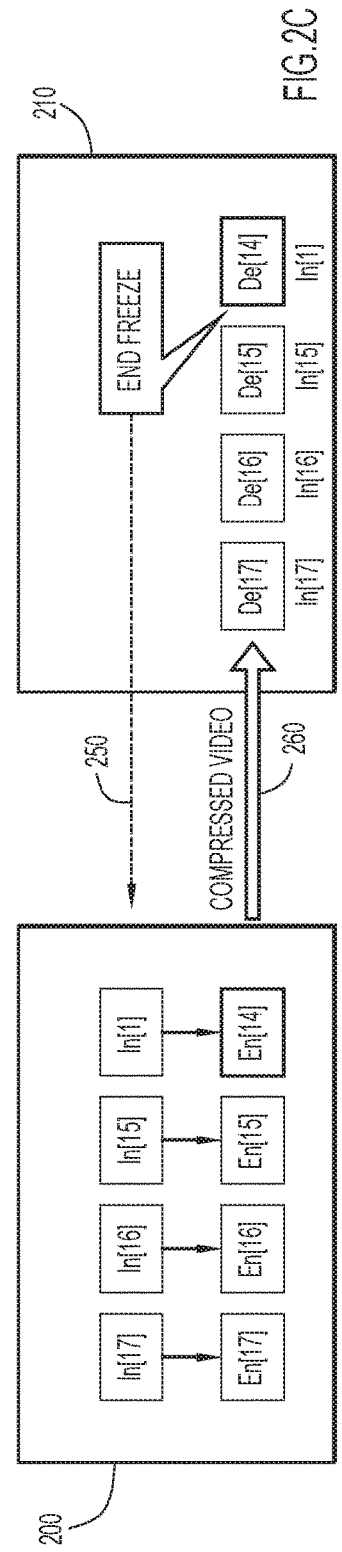

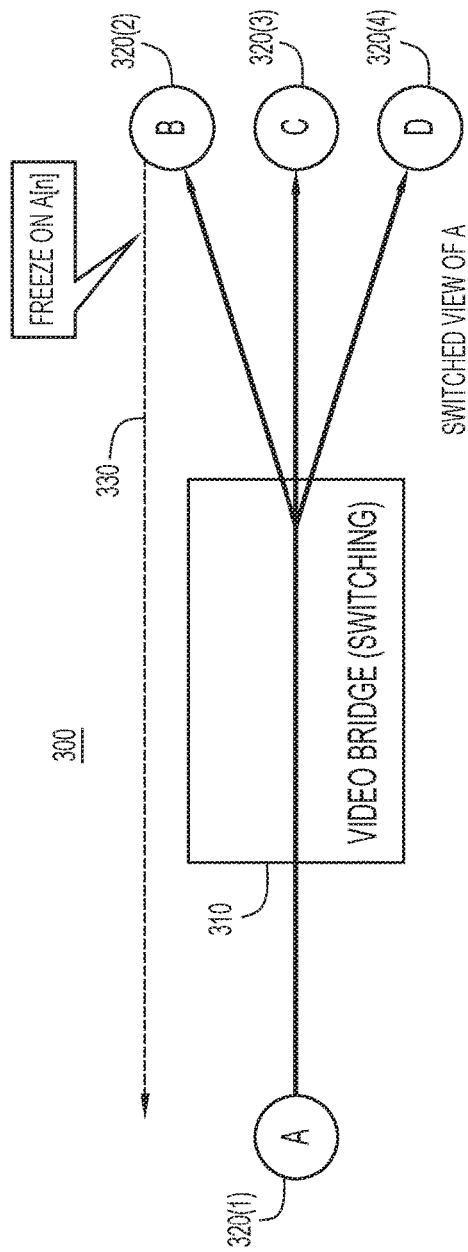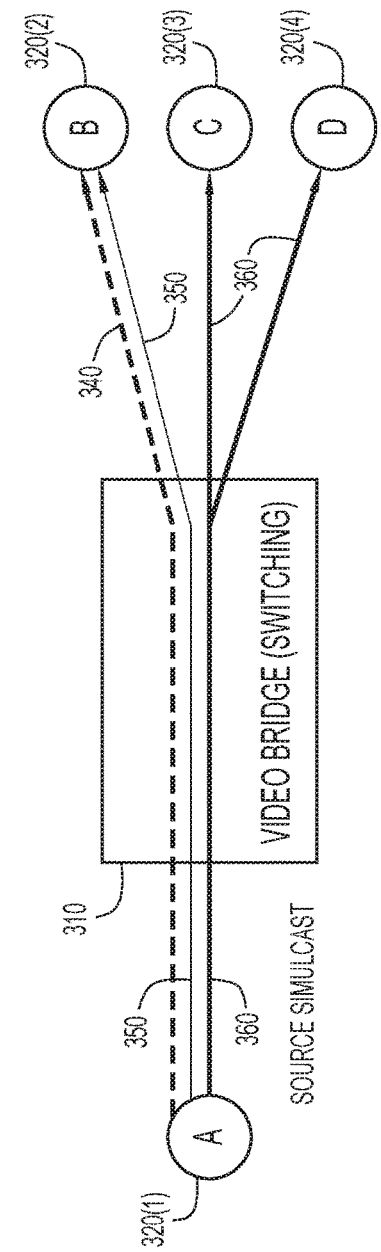
FIG.3A
FIG.3B

HIGH-FIDELITY FREEZE-FRAME FOR PRECISION VIDEO COMMUNICATION APPLICATIONS

TECHNICAL FIELD

The present disclosure relates to video communication.

BACKGROUND

Video conferencing is increasingly used in medical applications, with bi-directional video communication between both doctor and patient, and among distributed medical teams. High-fidelity images are useful in order to make clinical decisions, both from the camera showing the patient, and via an auxiliary video channel used to share medical imaging. When a medical professional receives a video stream showing either i) the patient in front of the camera, or ii) medical imaging shared via the auxiliary video channel, they may wish to examine an image more closely, by freezing it on a particular frame. This is more useful if the quality of the selected frozen image can be improved over and above that which is attained when transmitted as part of a high-framerate sequence, by adaptation of the encoding techniques towards a static input.

BRIEF DESCRIPTION OF THE DRAWINGS

FIGS. 2A-2C are diagrams illustrating operations associated with the high-fidelity freeze-frame mode, according to an example embodiment.

FIGS. 3A and 3B are diagrams illustrating operations of the high-fidelity freeze-frame mode as part of a video conference session supported by a switching video bridge, according to an example embodiment.

DESCRIPTION OF EXAMPLE EMBODIMENTS

Overview

Figure 1:
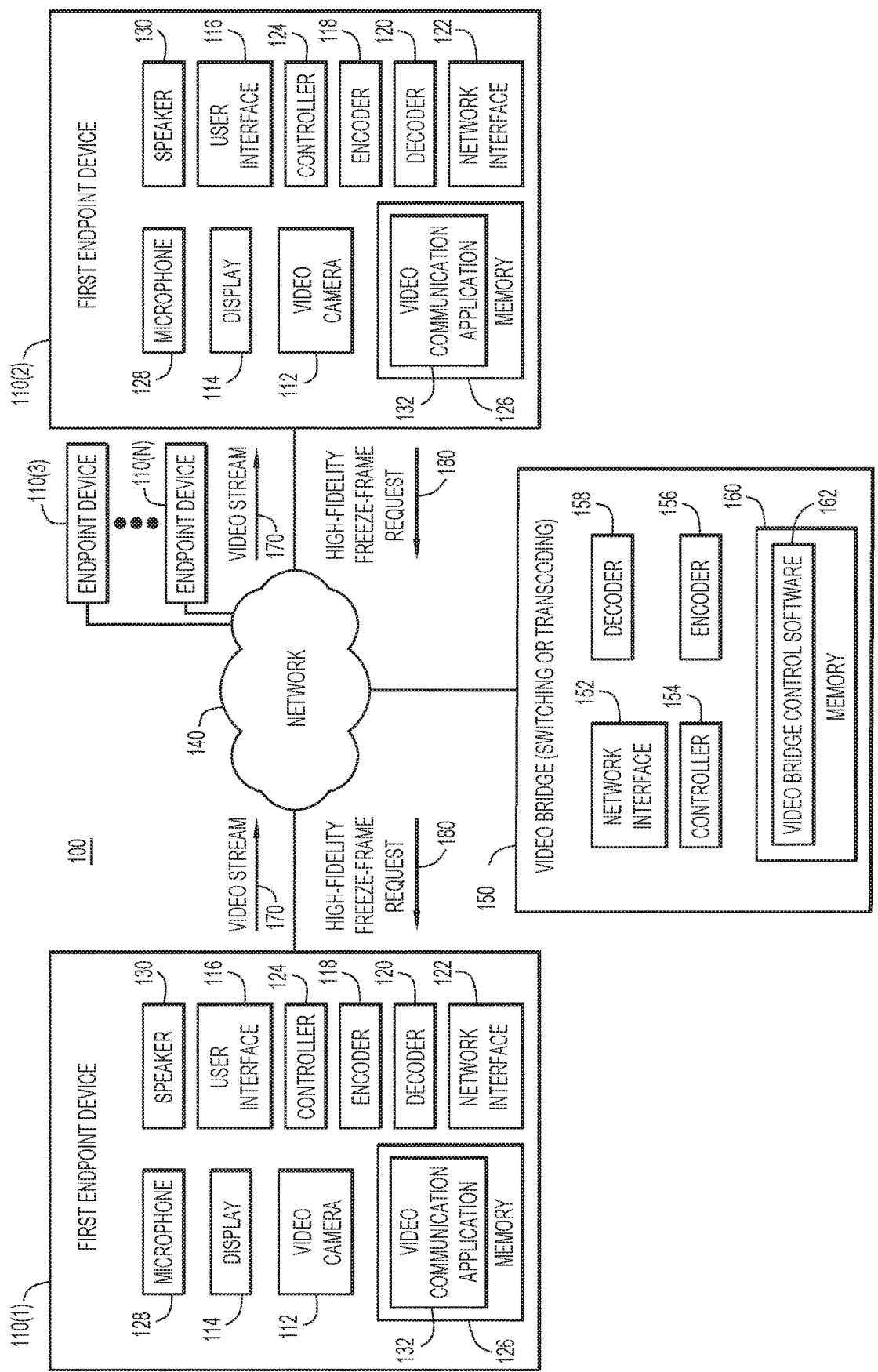
FIG. 1 is a block diagram of a system that is configured to support a high-fidelity freeze-frame mode for video generated at a first endpoint that is shared with one or more other endpoints, according to an example embodiment.

In accordance with one embodiment, a method is provided that is performed at a first device that is sharing with at least a second device, an encoded video stream for live video captured at the first device. The method includes receiving a first freeze-frame request initiated by the second device. The first freeze-frame request indicates that a user of the second device requests a high-fidelity freeze-frame of a first frame of the encoded video stream from the first device. The method further includes generating, with the video encoding process, a first sequence of encoded video frames of the first frame that is requested for a high-fidelity freeze-frame. Each encoded video frame of the first sequence is of progressively higher fidelity of the first frame.

In accordance with another embodiment, a method is provided that is performed at a second device that is receiving an encoded video stream for live video captured at a first device. The method includes generating a first freeze-frame request indicating that a user of the second device requests a high-fidelity freeze-frame of a first frame the encoded video stream from the first device. The method further includes sending the first freeze-frame request to the first device and receiving a first sequence of encoded video frames of the first frame. Each encoded video frame of the first sequence is of progressively higher fidelity of the first frame. The method further includes decoding the first sequence of encoded video frames for display of the first frame with progressively higher fidelity.

Example Embodiments

During normal video communication, point-to-point, of any respectable frame rate, every frame is going to discard information relative to what was available at the origin. The amount of information discarded is dependent on the bitrate to which the video sequence is compressed. Some video communication applications rely on very small details. With low contrast images, single pixel details would be eliminated by conventional video compression. Any amount of detail can be restored if enough time is taken to transmit the information and appropriate changes are made to the coding methods.

Video compression achieves a huge reduction in information density based on a range of lossy compression techniques. For real-time video communication at commonly used bitrates and frame rates, each frame is compressed to a maximum size in order that the sequence of frames can be delivered within the available bitrate of the transmission channel while ensuring smooth and timely playout at the receiver without long buffering delays. Thus, individual frames are encoded with only limited fidelity, and if live video is frozen it will not show detail that was acquired in the original imaging because that detail was likely eliminated in the compression process. Presented herein are techniques that adapt the encoded sequence to procure a receiver-specified static image from the live sequence in a high-fidelity rendition that shows fine spatial and low-contrast detail to support highly demanding image analysis.

Commonly, a real-time video encoder ensures that sudden large frame-to-frame changes will not cause the frame-size limit to be exceeded by setting a high minimum for a quantization parameter value used in the encoding process; this high minimum is a safety net applied to all frames, even if as a result they do not use their budgeted amount of encoded information. The quantization parameter is responsible for elimination of low-value post-transform coefficients that describe fine spatial detail and subtle variation in image levels, and generally controls the amount of information used to encode picture-to-picture differences. Such bounds to quantization parameter range means that each encoded size-limited frame will lack the fine detail (both spatial and low-contrast) that can be useful for high-end applications, such as telemedicine. Further, because a high floor to the quantization parameter prevents the encoding of small differences between the last encoded frame and the next input frame, even if the input to the encoding process is frozen, detail will not continue to be added to subsequent images. Finally, the limits to algorithmic methods in the encoder are often constrained along with the quantization parameter (commonly the latter is a key used to control the former), and this also limits the encoding of fine picture detail. In addition to elimination of detail, compression methods may also generate artifacts that create confusion with real detail.

Techniques are presented herein that enable applications to achieve higher fidelity still images on real-time video channels as well as provide the receiver with useful controls over what is presented at the receiver. The embodiments presented herein provide for signaling from the receiver to the sender that enables change of the nature of the video being provided, and the knowledge that video is to be frozen allows the encoding process at the sender to be changed to improve visual quality of a selected, or approximately selected, frame. The adaptation of encoding methods is useful to achieve high levels of image fidelity required by high-end applications (such as telemedicine) and greatly improves over a local receiver-side freeze of received video.

By giving freeze-frame initiation and control capability to the receiver, the receiver can hold/stop displaying a video frame so that it can be progressively refined/improved in quality based on new image frames received from the sender. This allows the receiver to obtain as much video detail as was captured by the original imaging. Use cases of these techniques include video captured by a video camera (e.g., at 30 fps) that would be used by a patient viewed by a remotely located physician for telemedicine applications, or by an auxiliary content channel that includes a video stream generated by an imaging device, such as a medical imaging device.

Reference is first made to FIG. 1. FIG. 1 illustrates a system 100 that includes a plurality of endpoint devices 110(1)-110(N). An endpoint device may include a video camera 112, a display 114, a user interface 116, a video encoder (encoder) 118, a video decoder (decoder) 120, a network interface 122 and a controller 124 and memory 126. Instead of, or in addition to the video camera 112, an endpoint device may include another type of video capture/generation device, such as used on medical imaging equipment. The endpoint device may also include a microphone 128 and a speaker 130.

The network interface 122 enables network communications, and may be embodied by a wired network interface card for wired network connectivity, and/or a wireless network interface card for wireless local area network connectivity or wireless wide area network connectivity (e.g., cellular service).

The controller 124 may be embodied by one or more microprocessors or microcontrollers. In one form, the controller 124 executes instructions stored in memory 126 to perform various control operations of the endpoint device. To this end, the memory 126 may store instructions for, among other functions, a video communication application 132, that enables video and/or other communications. For example, the video communication application 132 may be an online conferencing application of any type now known or hereinafter developed. In one example, the video communication application may be a function or plug-in of a web browser.

The encoder 118 and decoder 120 may be embodied by an integrated dedicated video codec hardware device, such an Application Specific Integrated Circuit (ASIC), or may be embodied by software executed by the controller 124 or other dedicated processor. In some instances, an endpoint, e.g., endpoint 110(1), may have multiple encoders or multiple encoder instances using the same encoding engine, commonly supported by on-chip hardware encoding). Each encoder or encoder instance is fed with a sequence of frames to produce an encoded stream according to a particular encoding type or compression type to be sent. This is of particular relevance in a scenario, such as that described below in connection with FIG. 3B where a sender sends 3 video streams: (a) freeze-frame images; (b) reduced-resolution live video; and (c) ongoing normal resolution live video. Moreover, the display 114, may further include a dedicated graphics processor, not shown in FIG. 1.

The display 114 may be a Liquid Crystal Display (LCD), Light Emitting Diode (LED) display or any other suitable display of any technology type now known or hereinafter developed.

The user interface 116 may include a keyboard and mouse, a dedicated keypad or buttons dedicated to certain functions, a touch-screen user interface that interacts with the display 114, or any other suitable user interface, including a voice-interactive user interface.

The endpoint devices 110(1)-110(N) may take a variety of forms, including a desktop computer, a laptop computer, a tablet device, a Smartphone, a video conference room endpoint, etc. Depending on the form taken, the various components of the endpoint device may be peripheral components or integrated components.

The endpoint devices 110(1)-110(N) may communicate via network 140. For simplicity, the network 140 is meant to be inclusive of one or more local area networks, wide area networks, wireless local area networks and wireless wide area networks.

The system 100 may further include, in some embodiments, a video bridge 150. The video bridge 150 may include one or more network interfaces 152, a controller 154, a video encoder 156 and a video decoder 158 and memory 160. The memory 160 may store software that is executed by the controller 154 to enable the video bridge to carry out its functions. To this end, the memory 160 is shown to store video bridge control software 162. Furthermore, the functions of the encoder 156 and decoder 158 may be performed by dedicated hardware (one or more video codecs) or by software stored in memory 160.

The video bridge 150 may be configured to perform video switching operations or video transcoding operations. When performing video transcoding operations, the video bridge 150 employs the functions of the encoder 156 and decoder 158, but the encoder 156 and decoder 158 are not needed when the video bridge 150 performs video switching operations. The video bridge 150 may, in one form, be a video conference server to which users establish user accounts and access video conference services from client applications (video communication application 132) running on endpoint devices 110(1)-110(N).

For description purposes, the first endpoint device 110(1) is an originator of a video stream 170 captured by the video camera 112 or other video capture/generation device. The video stream 170 is to be shared with one or more other endpoint devices, including at least, the second endpoint device 110(2). A user of the second endpoint device 110(2) may wish to invoke a high-fidelity freeze-frame function with respect to the video stream 170. The video stream 170 consists of a queue of encoded/compressed video frames generated by the encoder 118 of the first endpoint device 110(1). In some embodiments, the first endpoint device 110(1) may send the video stream 170 directly to the second endpoint device 110(2) as part of a point-to-point video call/communication session. In other embodiments, the first endpoint device 110(1) may send the video stream 170 to the video bridge 150, and the video bridge 150 may direct the video stream 170 to the second endpoint device 110(2) (as well as to other endpoint devices) as part of a video conference session, either without any transcoding or with transcoding, as described below. In either case, a user at the second endpoint device 110(2) may, at some point in time, desire to see a higher fidelity version of a portion of the video stream 170. The user at the second endpoint device 110(2) uses the user interface 116, e.g., a dedicated button on a screen, voice command, etc., in order to initiate the transmission of a high-fidelity freeze-frame request 180 to the sender of the video, e.g., the first endpoint device 110(1). Depending on whether the communication session is a point-to-point session or a switched/transcoded session, the high-fidelity freeze-frame request 180 may be sent direct to the first endpoint device 110(1) or sent via the video bridge 150. The first endpoint device 110(1) may respond to the high-fidelity freeze-frame request 180 by stopping input of raw/captured video to the video encoder 118. The operations related to the high-fidelity freeze-frame process performed by the first endpoint device 110(1), by the second endpoint device 110(2) and optionally by the video bridge 150 are described in more detail below in connection with FIGS. 2A-2C, 3A, 3B, 4A, 4B, 5A and 5B.

Point-to-Point Session

Reference is now made to FIGS. 2A-2C, with continued reference to FIG. 1. The case of a point-to-point video call or communication session is first described, where in FIGS. 2A-2C, there is a sender endpoint 200 that is the source/origin of video being sent to a receiver endpoint 210. The sender endpoint 200 may correspond to endpoint device 110(1) shown in FIG. 1, and the receiver endpoint similarly may correspond to endpoint device 110(2). In the example of FIG. 2A, the sender endpoint 200 generates input video frames In[0], In[1], In[2] and In[3], where In[0] is the oldest and In[3] is the newest, in this example. The sender endpoint 200 encodes the input video frames In[0], In[1], In[2] and In[3], to produce encoded frames En[0], En[1], En[2] and En[3], respectively, which are sent as part of a compressed/encoded video stream 220 to the receiver endpoint 210.

The receiver endpoint 210 receives the encoded frames En[0], En[1], En[2] and En[3] and generates decoded frames De[0], De[1], De[2] and De[3], which correspond to input video frames In[0], In[1], In[2] and In[3] generated at the sender endpoint 200.

At some point while the compressed video stream 220 is being sent to receiver endpoint 210, a user at the receiver endpoint 210 may desire to see a higher fidelity freeze-frame of the video received at the receiver endpoint 210. The user at the receiver endpoint 210 sends a high-fidelity freeze-frame request 230 to the sender endpoint 200. The signaling used by the receiver endpoint 210 to send the high-fidelity freeze-frame request 230 to the sender endpoint may be a generic Real-Time Control Protocol (RTCP) application message that is defined to signal the freeze instruction. As an example, the high-fidelity freeze-frame request 230 may indicate a high-fidelity freeze-frame of frame [1], and that it does not desire frames subsequent to frame [1].

Reference is now made to FIG. 2B. When the sender endpoint 200 receives the high-fidelity freeze-frame request 230, it may pause the video input to the encoding and transmission process, allowing the encoding (and transmission) of the frozen input to continue with adaptations of encoding methods in order to improve the visual quality of a succession of encoded frames for a given video frame. Specifically, on each new frame encoded the video sender's encoder is then assured, or alternately detects, that the input has not changed, and can adapt its encoding methods to this freeze-frame mode for a given frame, e.g., frame [1] in the example of FIG. 2B. The encoder may progressively reduce the quantization parameter value and associated thresholds to encode a sequence of frames that successively improve the fidelity of the image delivered to the receiver. Alternatively, under the constraints of pixels-per-second negotiated between the sender and the receiver, once the content is frozen, the balance between pixels-per-frame and frames-per-second can be revisited to favor the pixels-per-frame, to allow for a better delivered image than would have been possible retaining the frame size used during the live part of the delivery. For example, as shown in FIG. 2B, the sender endpoint supplies the video frame In[1] to its encoder to generate encoded video frame En[4], derived from a Long Term Reference Frame (LTRF) based on En[1] generated by the sender endpoint, as shown in FIG. 2A. However, the sender endpoint 200 generates the next encoded video frame, En[5], based on video frame In[1], but with a reduced quantization parameter (QP) value, such that encoded video frame En[5] is higher quality than encoded video frame En[4]. The sender endpoint 200 generates encoded video frame En[6] from video frame In[1] with a further reduced quantization parameter value than that used to generate frame En[5], and generates encoded video frame En[7] with still a further reduced quantization parameter value than that used to generate frame En[6]. Thus, as indicated at 240, the sender endpoint 200 generates and sends to the receiver endpoint 210 a sequence of encoded video frames with progressively improved fidelity/quality for the content of video frame In[1].

The receiver endpoint 210 receives the encoded frames En[4], En[5], En[6] and En[7] and decodes them to produce decoded frames De[4], De[5], De[6] and De[7] which are different versions of the same video frame In[1]. Specifically, as shown in FIG. 2B, frame De[4] is of greater fidelity/quality than frame De[1] (received before the freeze-frame event), frame De[5] is of greater fidelity/quality than frame De[4], frame De[6] is of greater fidelity/quality than frame De[5] and frame De[7] is of greater fidelity/quality still than frame De[6]. Thus, a user at receiver endpoint 210 will be able to see frame In[1] with increasing improved quality/fidelity.

In addition, encoding heuristics may be adapted to redistribute computational effort towards better quality in the high-fidelity freeze-frame mode. For example, the sender endpoint 200 may perform limited motion estimation, or none at all, when successive inputs are known to be static, and the compute budget of the encoder of the sender endpoint 200 can be used for more exhaustive evaluation of encoding modes.

Turning to FIG. 2C, the receiver endpoint 210 may stop the high-fidelity freeze-frame mode by sending a suitable end-freeze request 250 to the sender endpoint 200. Prior to sending the end-freeze request 250, the sender endpoint 200 may have been continuing to send to the receiver endpoint 210 improved fidelity/quality versions of video frame In[1]. After receiving encoded video frame En[14] that resulted in decoded frame De[14], which is an improved fidelity/quality version of video frame In[1], the sender endpoint 200 starts allowing new video to be supplied to the encoding and transmission processes such that, beginning with captured video frame In[15], the sender endpoint 200 generates encoded frames using the nominal encoding parameters that the sender endpoint 200 had been using prior to entering the high-fidelity freeze-frame mode. Thus, as shown at 260, the sender endpoint sends encoded/compressed frames En[15], En[16], En[17], etc., for input video frames In[15], In[16], In[17], etc.

Using these methods, a freeze-frame video stream attains a higher level of quality over a relatively small number of newly encode frames, and the stream transmission can then revert to a minimal or suspended state (since there is no new information to send). Thus, encoding remains within the bitrate and framerate of the channel, delivering a static-but-improving image that is of progressively higher quality, ultimately achieving a high-fidelity rendition of the original capture of the input video.

In summary, FIGS. 2A-2C are illustrative of a process by which a user can freeze video of whatever the user wishes, at the sender side. The encoder tends to apply a "high" floor as defined by the quantization parameter. Unless that constraint is adjusted, it will not be possible get all of the video image details through on the channel to the receiver. By going into the high-fidelity freeze-frame mode in which the inputs and the encoding processes are frozen, then the encoder can modify its encoding methods, including suspending or lowering any of the floors to obtain a high-fidelity video frame.

Switched Meetings

Reference is now made to FIGS. 3A and 3B for a description of the high-fidelity freeze-frame mode applied in a switched meeting context. FIGS. 3A and 3B show a system 300 in which a video bridge 310 serves communication among a plurality of endpoints 320(1)-320(4), also identified in the figures as endpoints A-D, respectively. The video bridge 310 is configured to support a switched meeting/conference. In a switched meeting, media is sent from the source to multiple receivers via a video bridge. For example, endpoint A is a source of video that is sent, via the video bridge 310, to endpoints B, C and D, as shown in FIG. 3A. As an example, a user at endpoint B sends, via video bridge 310, a high-fidelity freeze-frame request 330, at frame A[n], to the sender endpoint A.

Reference is made to FIG. 3B. For the high-fidelity freeze-frame techniques to allow each receiver the ability to select a freeze frame, and for that to be enhanced by subsequent frames, while the other receivers see continuous unfrozen video, the sender, e.g., endpoint A, sends both the ongoing live video and the updating freeze-frame video. Thus, when endpoint A receives the high-fidelity freeze-frame request 330, endpoint A simulcasts multiple "qualities" of the source video to the video bridge 310. Specifically, as shown in FIG. 3B, the endpoint 320(1) sends the frozen/improving static view of frame A[n] in freeze-frame video stream 340, and the video bridge directs the freeze-frame video stream 340 to the endpoint B. Endpoint A also sends in video stream 350 a reduced resolution "live" view, perhaps for display as a picture-in-picture of the frozen/improving static view of frame A[n] in video stream 340. Further still, endpoint A continues to send the "live" video stream 360 that it had been sending prior to receiving the high-fidelity freeze-frame request 330. The video bridge 310 sends freeze-frame video stream 340 carrying the frozen/improving static view of frame A[n] and the video stream 350 carrying a reduced resolution live view from endpoint A, to endpoint B. The video bridge 310 may also send to endpoints C and D the video stream 360 carrying the normal live video at endpoint A.

Any multi-streaming protocol, now known, or hereinafter developed, may be used to support the streaming mechanism depicted in FIG. 3B. The request for a static-but-improving quality can be made by the receiver that wishes to freeze the frame (specifying the frame to be frozen by a timestamp). The video bridge 310 relays this request to the sender endpoint. The new freeze-frame quality is sent as part of the source simulcast from the sender, along with live video for the majority of viewers. Multiple freeze-frame qualities (showing different freeze points for different receivers) may be sent either serially over the same video stream, or in parallel as alternate freeze-frame qualities.

As explained above, in the scenario of FIG. 3B, endpoint A has a second encoder, or invokes a second encoder instance, to encode the freeze-frame encoding for video stream 340, while continuing to encode, with a first encoder or first encoder instance, the ongoing live video (at normal resolution) for video stream 360. Moreover, endpoint A has a third encoder, or third encoder instance, to encode the ongoing live video (at reduced resolution) for video stream 350. This is possible by sub-dividing the bandwidth between the endpoint A and the video bridge 310, and to the extent that the endpoint A has the computational capacity to encode several independent live or frozen versions of the source capture. Since limited bandwidth is the root of the initial constraint on quality, the available bandwidth may be divided between the multiple transmitted streams, and so the "live" video stream(s) 350 and/or 360 is/are may be of a lesser bitrate (resolution, framerate, quality or all three) than before the freeze-frame request, or not enough bitrate may be freed for the (freeze-frame) video stream 340 to be transmitted.

Thus, FIGS. 3A and 3B show that there may be a differentiating experience, when high-fidelity freeze-frame is employed. With multi-stream video, one receiver can express a preference for what it wants to receive and the sender sends more than one version (in terms of quality) of what is captured.

There may be multiple endpoints that receive the video and it may be desirable for all endpoints to see the same video, such that whichever endpoint from which the request is sent to engage this high-fidelity freeze-frame experience, that endpoint drives the experience of that video stream for all the endpoints, e.g., endpoints B, C and D in the example of FIG. 3B.

Transcoded Meetings

Figure 4A:
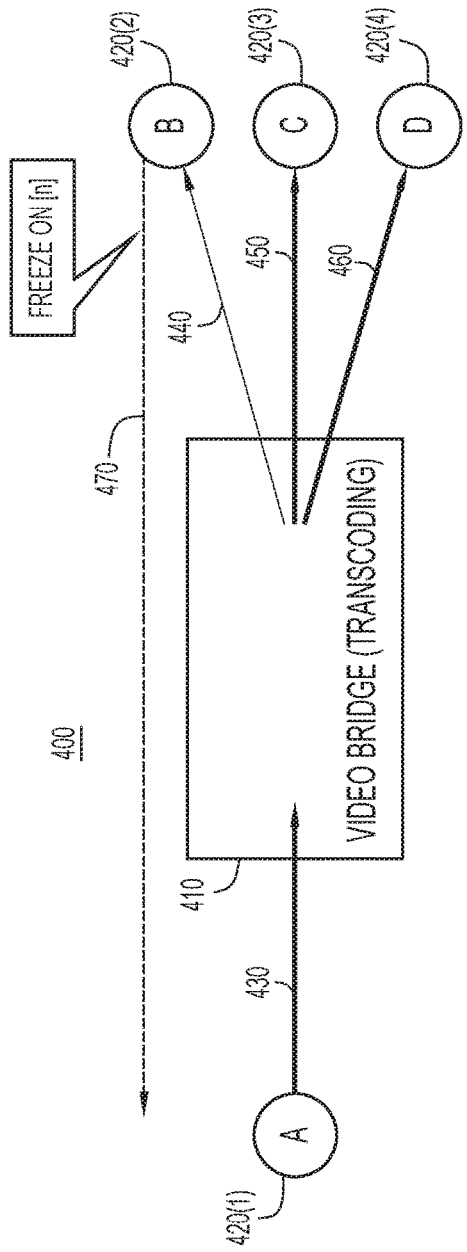
FIGS. 4A and 4B are diagrams illustrating operations of the high-fidelity freeze-frame mode as part of a video conference session supported by a transcoding video bridge, according to an example embodiment.
Figure 4B:
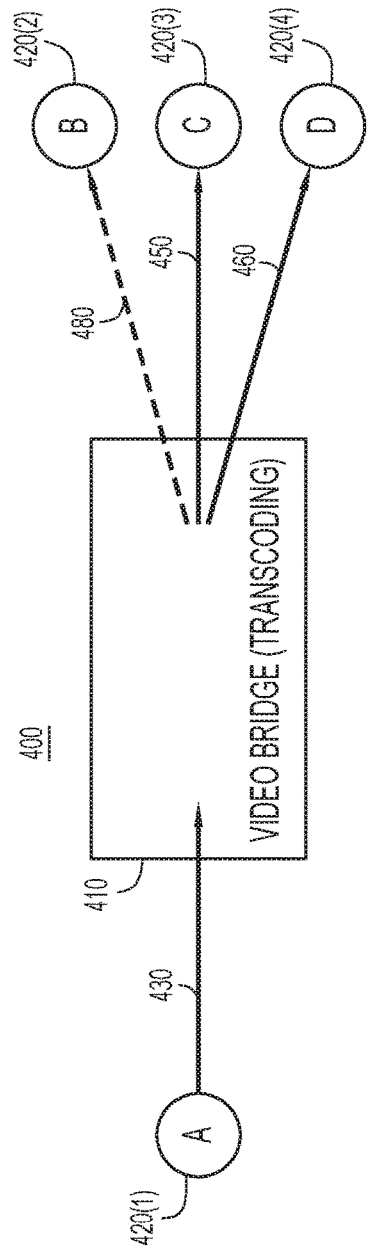

Reference is now made to FIGS. 4A and 4B, which show a system 400 that is similar to system 300 of FIGS. 3A and 3B, except that the video bridge 410 is a transcoding video bridge. The system 400 includes endpoints A, B, C and D, denoted by reference numerals 420(1), 420(2), 420(3) and 420(4), respectively. As shown in FIG. 4A, video bridge 410 is serving a communication session/meeting during which a video stream 430 from endpoint A is being shared with endpoints B, C and D. In the transcoding case, there may be multiple receivers viewing the original source, but each receiver may receive its own version of the original encoded video, but re-encoded by a transcoding bridge. For example, the video bridge 410 may transcode the video stream 430 to produce a video stream 440 that is a bandwidth-limited reduced-resolution version of video stream 430, whereas endpoints C and D receive video streams 450 and 460 which perhaps are also different transcoded versions of video stream 430.

In the system 400, it is possible for each receiver endpoint to independently elect to freeze their own incoming video, and for the video bridge 410 to send a video stream encoded with adaptation for the freeze-frame mode, while other video streams continue to be sent unfrozen live video. However, that does not improve upon the quality originally obtained from the sender and so limits what can be propagated to any of the receivers. For example, in FIG. 4A, endpoint B sends a high-fidelity freeze-frame request 470, which the video bridge forwards to endpoint A.

In FIG. 4B, the video bridge 410 instructs the endpoint A to send a freeze-frame to the video bridge 410, encoded with the appropriate high-fidelity methods. The video bridge 410 may in turn encode the freeze-frame for any of the receivers requesting a freeze-frame, e.g., endpoint B. The challenge at this point is for endpoint A to progressively improve the image that one or more receivers, e.g., endpoint B, have elected to freeze, while still showing live video to other receivers. This can be done by the video bridge 410 requesting that endpoint A send additional qualities in parallel, similar to the multi-stream method described above. This is dependent on endpoint A supporting requests for different variants of its ongoing stream. Alternatively, when endpoint B requests a freeze frame, endpoint A can freeze and improve the video quality of the frozen frame for all receiver endpoints, until a high quality-level is achieved, and then resume live video for all receivers except for endpoint B.

When meeting the live frame rate to endpoint B, the resolution (pixels per frame) may be reduced, and transcoding can make this adaptation, as shown by video stream 440 that the video bridge 410 sends to the endpoint B in FIG. 4A. However, when the input is frozen, the frame rate is no longer important, and it can be reduced in order to deliver video with more pixels per frame, which will enable the progressive higher fidelity transmission of the frozen frame from endpoint A (and endpoint A may continue to send live video for propagation to every other live receiver). This is indicated in FIG. 4A in which a narrower solid line (meaning low resolution/bitrate live video) is shown for video stream 440 sent by the video bridge 410 to endpoint B. On the other hand, a wider dashed line (meaning higher/full resolution freeze-frame video) is shown in FIG. 4B to represent a video stream 480 for the frozen/improving static view of a frame A[n] that the video bridge 410 sends to endpoint B. In the example of FIG. 4B, the video bridge 410 continues to send the video streams 450 and 460 to endpoints C and D, respectively.

Thus, a transcoded meeting has the advantage that can it can easily differentiate what is delivered to any participating endpoint in a meeting. However, it may not be so easy to obtain a special version of the sender's video once. It may be possible to enforce what all participating endpoints see, or what is frozen while updates are sent to the frame. There is a potential scenario in which what was sent from the original sender was very good and then what the receiver was able to receive was compromised by poor downlink conditions. The frozen frame will get to the absolute limit of what was originally sent and held at the bridge for progressive refinement across the constraint of the downlink rate to one of the receivers.

Flexible Freeze-Frame

Figure 5A:
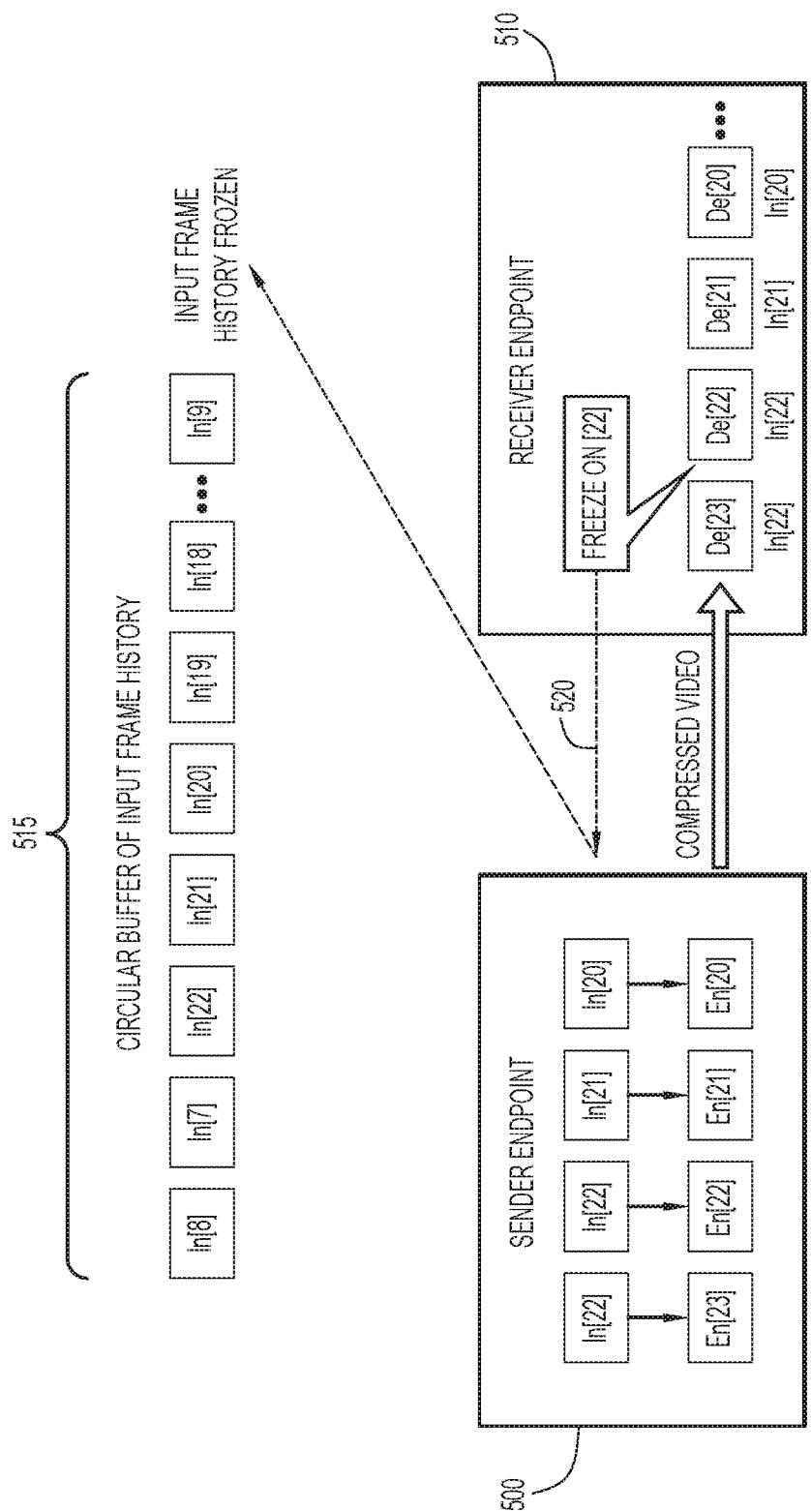
FIGS. 5A and 5B are diagrams illustrating operations by which multiple frames may be selected by a receiver endpoint for the high-fidelity freeze-frame mode, according to an example embodiment.
Figure 5B:
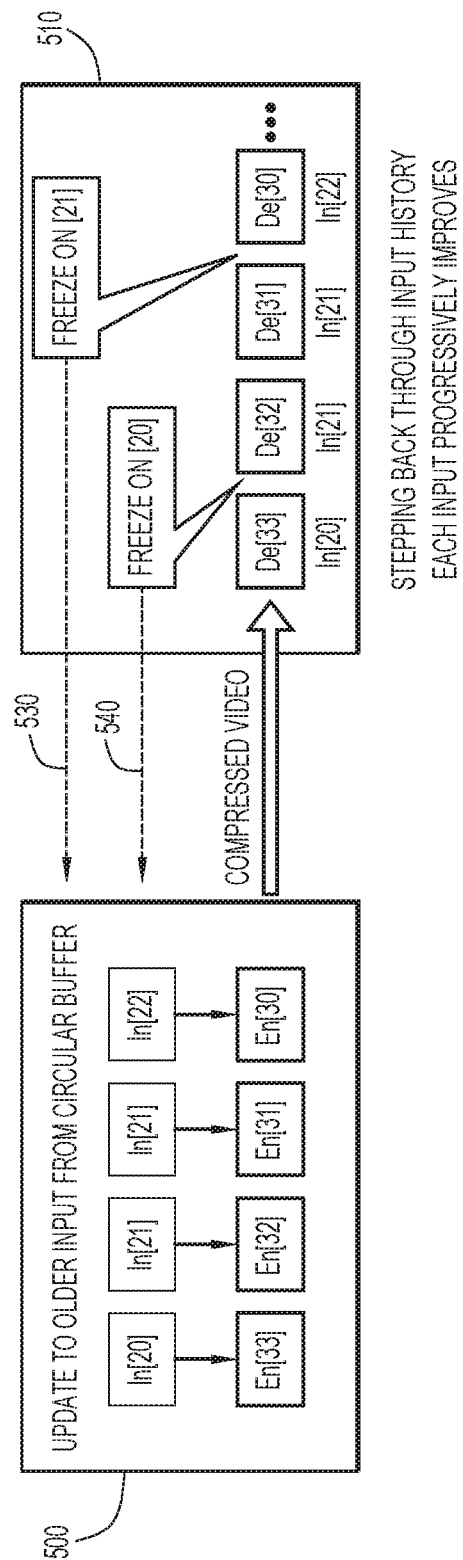

Reference is now made to FIGS. 5A and 5B. In order to allow a participating endpoint to see exactly the image/frame desired, selected from a live sequence of frames in a video stream, then a buffer of recent frames should be retained at the receiver endpoint and the sender endpoint. The receiver endpoint can specify to the sender endpoint which frame to be sent as a freeze-frame, via a timestamp, and that becomes the static input to the freeze-frame encoding process. This can even extend to a receiver endpoint reviewing the buffer of recent frames to find the best image to see in detail, with each reviewed image being signaled to the sender endpoint and immediately becoming the freeze-frame input at the sender endpoint, driven by its matching buffer of recent frames (and aided by appropriate use of Long-Term Reference Frames).

As shown in FIG. 5A, a sender endpoint 500 is sending a video stream to a receiver endpoint 510. The video stream includes encoded frames En[20], En[21], En[22] and En[23] that have been encoded by the sender endpoint 500 from input video frames In[20], In[21], In[22] and In[23]. The sender endpoint 500 maintains a circular buffer 515 of input frame (e.g., raw or unencoded video frames) history, as shown in FIG. 5A.

The receiver endpoint 510 receives the encoded frames En[20], En[21], En[22] and En[23] and decodes them to recover the input frames In[20], In[21] and In[22], but a user of receiver endpoint 510 decides to send a first high-fidelity freeze-frame request 520 around the time of occurrence of a frame [22], as shown at 520. When the sender endpoint 500 receives the first high-fidelity freeze-frame request 520, it determines, based on a timestamp of the high-fidelity freeze-frame request 520, that the receiver endpoint 510 is requesting frame [22] to be frozen and sent with progressively higher fidelity. Thus, the sender endpoint 500 starts to send frame [22] repeatedly again with progressively higher fidelity. The sender endpoint 500 also freezes the input frame history buffer. If live view was ongoing, a second circular input buffer would be used that would be recording the sequence of live view frames, in order to enable an updated freeze-frame choice from what the receiver was seeing as the live view.

The sender endpoint 500 may continue to send frame [22] with progressively higher fidelity, and as shown in FIG. 5B, the sender has continued doing this through frame En[30] from which the receiver endpoint 510 has generated decoded frame De[30] representing a high-fidelity version of frame [22]. However, after the receiver endpoint 510 generates decoded frame De[30] for displaying a high-fidelity version of frame [22], the user of receiver endpoint 510 may send a second high-fidelity freeze-frame request 530 for frame [21]. The sender endpoint 500 obtains frame In[21] from its history buffer and uses In[21] to generate and send encoded frames En[31] and En[32], which represent frame [21] but with progressively higher-fidelity than the quality with which frame [21] was originally sent. Further still, shortly thereafter, the user of receiver endpoint 510 may send a third high-fidelity freeze-frame request 540 for frame [20]. The sender endpoint 500 then obtains frame In[20] from its history buffer and uses In[20] to generate En[33] which is a version of frame In[20] but with higher fidelity, and will continue to do that with progressively higher-fidelity.

Thus, as depicted in FIGS. 5A and 5B, due to the back channel between the receiver and the sender, and that the sender has the original image at the best quality that was captured from a camera or other imaging device, the sender and receiver may hold a buffer of the last predetermined number of frames (e.g., 64 frames).

Since there is generally a time lag between the reception of a new frame at the receiver and the generation of the frame at the sender, by the time a user at the receiver initiates the high-fidelity freeze-frame request, the user may have missed the exact image the user wanted to see. Thus, it may be useful to allow a user at the receiver to step backwards through a buffer of frames covering the last, e.g., 10 seconds of video, and have the sender improve select ones of those frames. As the receiver settles on the image, it will progressively improve itself. So long as the frame is maintained in the circular buffer, it is eligible for this kind of progressive improvement.

For example, the receiver can go back to just before a first freeze-frame request was initiated, and go back even further. The sender has a record of the original coding input for a predetermined number of frames in the past, and can progressively improve a given one of those frames. Thus, a user at the receiver may initiate freeze-frame on frame n or frame n−1 or frame n−2 as far back in the past as the system maintains in order to find the best image and see whatever it was for which the user at the receiver initiated the freeze-frame request. Access to the circular buffer 515 is given to the receiver to essentially step back through history up to some limit, and begin the progressive refining process for a given frame in the circular buffer 515.

The delivery of the frozen frame could be combined with a receiver-specified zoom region, allowing magnification of a user-specified part of the frozen image that is delivered, to the limit of the resolution of the original captured image stored at the sender.

Stream Parameters

When video is live, resolution may be constrained by the available channel bitrate or receiver computation capabilities, in order that a target frame rate can be delivered for effective rendering of motion. Once the freeze-frame mode is invoked, and frame rate is therefore no longer a concern, the resolution can be changed to the maximum available at the receiver to maximize visible detail. This may result in a new keyframe at resolution change (e.g. with H.264), but that frame and others following can be suppressed from display until a nominal level of quality is achieved, at which point the original resolution freeze-frame is replaced by the new maximum-resolution freeze-frame.

Once freeze-frame viewing at a high level of quality is established, packet loss would be detrimental to quality, since any recovery keyframe sent over a low bitrate channel would either regress quality or take a substantial time to be transmitted. There are several existing video resilience techniques which can preserve quality in freeze-frame mode.

First, if the receiver of a freeze-frame view detects packet-loss on the next frame of incoming video, then that partial frame should not be displayed, and no new frame should be displayed until it resynchronizes the decoder. Since the image to be shown is intended to be frozen, there is nothing lost in invoking "freeze conceal" when video synchronization is lost.

Second, while the freeze-frame quality is being improved by ongoing transmission of video, then normal resilience techniques should be applied, including rate adaptation, Forward Error Correction (FEC)-encoding of redundant recovery information, and packet retransmission. Packet retransmission is no longer hindered by round-trip delay, since once in freeze-frame mode the "smoothness" of video is no longer a concern, and rapid completion of any partly-transmitted frame is probably best attained with this method.

Third, when there is packet loss that cannot be recovered by retransmission, the best way to resynchronize the receiver decoder is to encode the next frame based on a reference frame that the sender knows was successfully received. Recovery using Long-Term Reference Frames (LTRFs) based on feedback from receivers to confirm which references are available is an established video resilience technique in conferencing.

Fourth, once nominal quality is achieved in a freeze-frame, and the image is unchanging and cannot be improved, to continue to send video is a vulnerability to packet loss. Either the video transmission should be suspended, or any ongoing transmission for continuity should consist of a sequence of non-reference frames, the loss of which does not require resynchronization.

Figure 6:
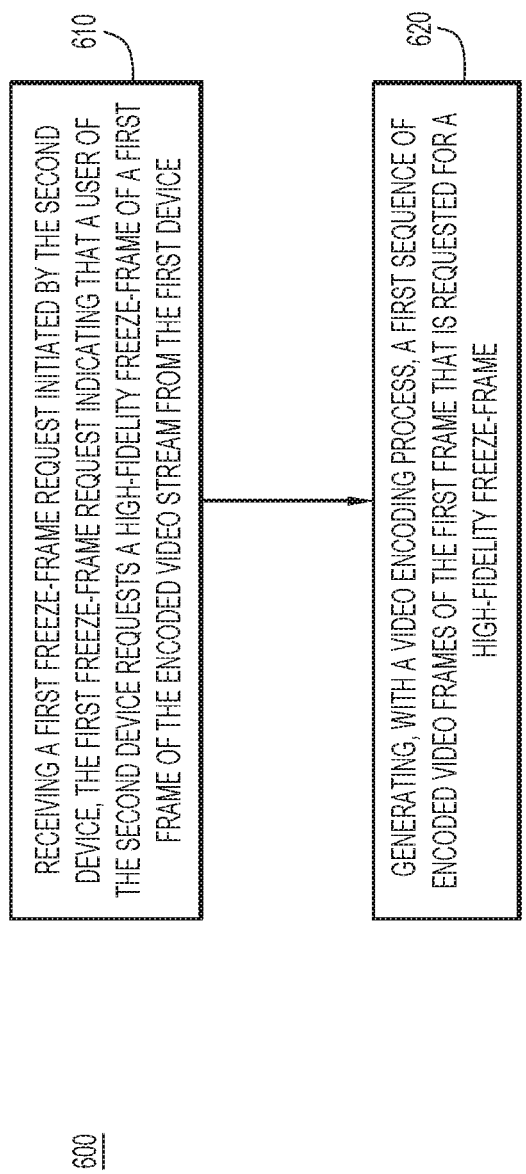
FIG. 6 is a flow chart depicting operations performed by an endpoint configured to send an encoded video stream and encoded frames according to the high-fidelity freeze-frame mode, according to an example embodiment.

Reference is now made to FIG. 6. FIG. 6 illustrates a flow chart depicting a method 600 performed at a sending end-point device, according to the embodiments presented herein. For the sake of this description, the method 600 is performed at a first device that is sharing with at least a second device, an encoded video stream for live video captured at the first device. At 610, the method involves receiving a first freeze-frame request initiated by the second device. The first freeze-frame request indicates that a user of the second device requests a high-fidelity freeze-frame of a first frame of the encoded video stream from the first device. At 620, the method includes generating, with a video encoding process, a first sequence of encoded video frames of the first frame that is requested for a high-fidelity freeze-frame. Each encoded video frame of the first sequence is of progressively higher fidelity of the first frame.

The method 600 may further include, in response to the first freeze-frame request, stopping input of video to the video encoding process that is used to produce the encoded video stream at the first device. Moreover, the method 600 may further include: receiving an end-freeze request indicating that the user of the second device requests to end the high-fidelity freeze-frame of the first frame and resume receiving the encoded video stream from the first device; and in response to the end-freeze request, supplying the video to the video encoding process to produce the encoded video stream at the first device.

According to one aspect, the method 600 may further include transmitting the first sequence of encoded video frames of the first frame to the second device as part of a point-to-point video communication session between the first device and the second device. The transmitting the first sequence of encoded video frames of the first frame may be made on an auxiliary channel between the first device and the second device, and the encoded video stream for the live video may be transmitted on a main channel between the first device and the second device.

According to another aspect, the method 600 may include transmitting the first sequence of encoded video frames of the first frame to a video bridge that forwards the first sequence of encoded video frames of the first frame to the second device as part of a video conference session.

Further still, the method 600 may further include: generating, with the video encoding process, a reduced resolution encoded video stream of the live video at the first device; and transmitting the reduced resolution encoded video stream of the video to the video bridge, which in turn forwards the reduced resolution encoded video stream to the second device for display as a picture-in-picture in an image of the first sequence of encoded video frames of the first frame.

Further yet, according to an aspect, the method 600 involves simultaneously with transmitting the first sequence of encoded video frames of the first frame and transmitting the reduced resolution encoded video stream, transmitting to the video bridge the encoded video stream of the live video at the first device, wherein the video bridge forwards the encoded video stream of the live video to one or more other devices that are participating in the video conference session.

Similarly, the method 600 may further include: simultaneously with transmitting the first sequence of encoded video frames of the first frame, transmitting to the video bridge the encoded video stream for the live video, wherein the video bridge transcodes the encoded video stream for the live video into one or more transcoded video streams, each of a different encoding type, for forwarding to one or more other devices that are participating in the video conference session.

According to still a further aspect, the operation 610 of generating the first sequence of encoded video frames of the first frame may include progressively reducing a quantization parameter value for each encoded video frame of the first sequence of encoded video frames encoded by the video encoding process.

According to yet a further aspect, the operation 610 of generating the first sequence of encoded video frames of the first frame may include adjusting a number of pixels-per-frame for the encoded video frames of the first sequence to achieve the progressively higher fidelity.

According to yet another aspect, as depicted in FIGS. 5A and 5B, the method 600 may further include: storing at the first device in a circular buffer raw video frames of the live video; receiving a second freeze-frame request initiated by the second device, the second freeze-frame request indicating that the user of the second device requests a high-fidelity freeze-frame of a second frame of the encoded video stream from the first device; in response to the second freeze-frame request, stopping the generating of the first sequence of encoded video frames of the first frame; retrieving from the circular buffer a raw video frame corresponding to the second frame of the second freeze-frame request; and generating, with the video encoding process, a second sequence of encoded video frames of the second frame that is requested for a high-fidelity freeze frame, each encoded video frame of the second sequence being of progressively higher fidelity of the second frame.

Figure 7:
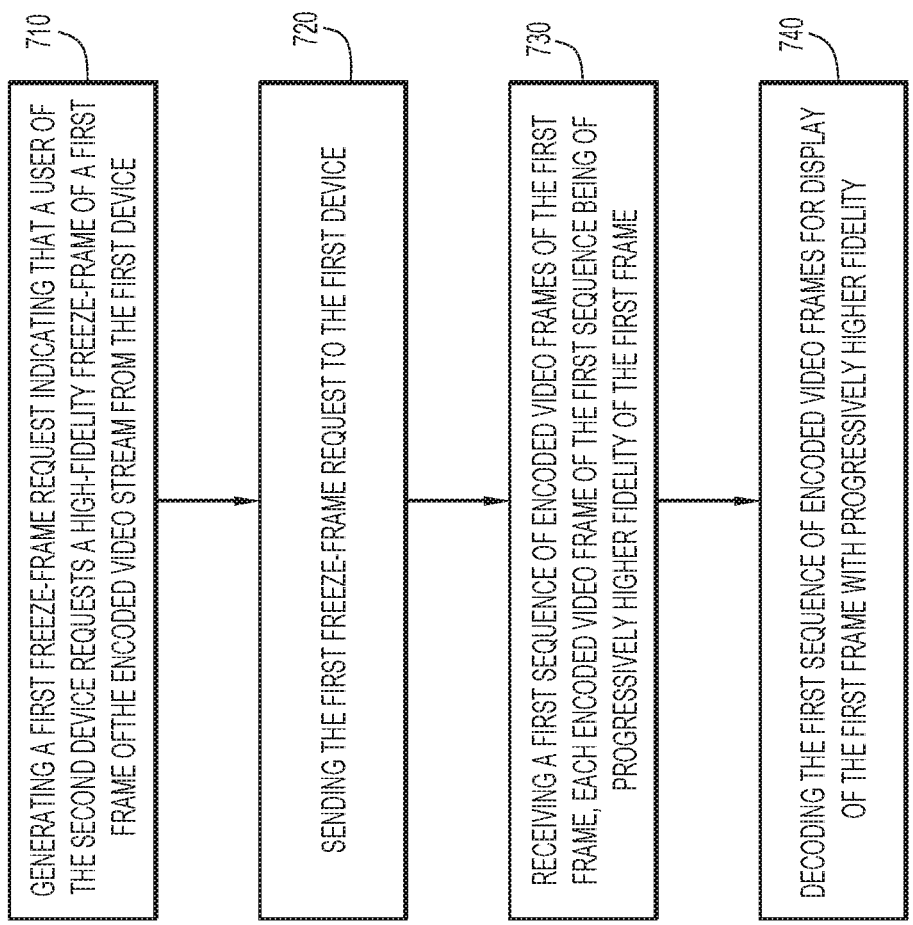
FIG. 7 is a flow chart depicting operations performed by an endpoint configured to receive an encoded video stream and encoded frames according to the high-fidelity freeze-frame mode, according to an example embodiment.
Figure 8:
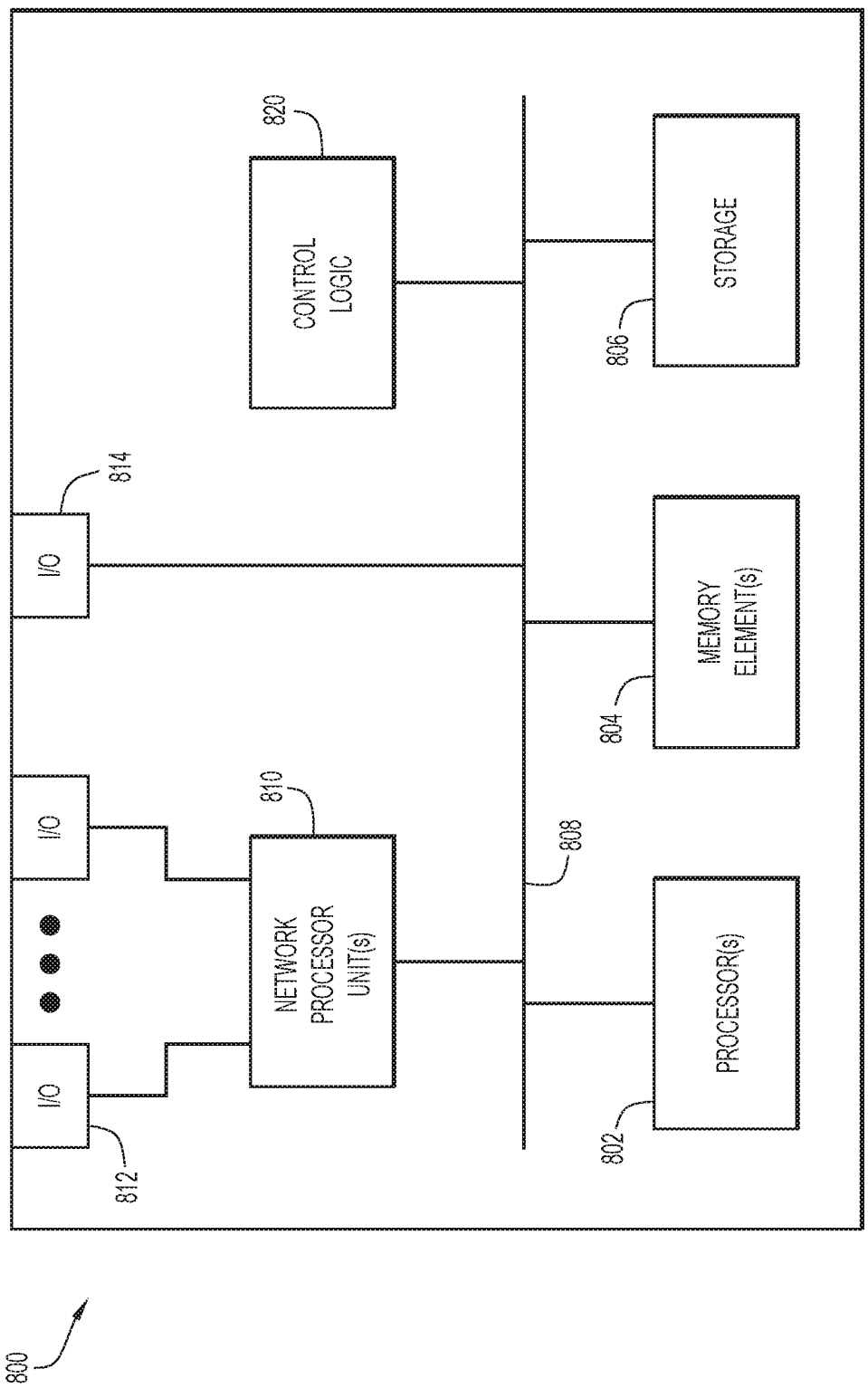
FIG. 8 is a hardware block diagram of a computing device that may be configured to perform the techniques presented herein, according to an example embodiment.

Reference is now made to FIG. 7. FIG. 8 illustrates a flow chart depicting a method 700 performed by an endpoint device (a second device) that is receiving an encoded video stream for live video captured at a first device. The method 700 includes at 710, generating a first freeze-frame request indicating that a user of the second device requests a high-fidelity freeze-frame of a first frame of the encoded video stream from the first device. At 720, the method 700 includes sending the first freeze-frame request to the first device. At 730, the method 700 includes receiving a first sequence of encoded video frames of the first frame. Each encoded video frame of the first sequence is of progressively higher fidelity of the first frame. At 740, the method 700 includes decoding the first sequence of encoded video frames for display of the first frame with progressively higher fidelity.

According to a further aspect, the method 700 may further include generating an end-freeze request indicating that the user of the second device requests to end the high-fidelity freeze-frame of the first frame and resume receiving the encoded video stream from the first device; and sending the end-freeze request to the first device.

According to yet a further aspect, the first sequence of encoded video frames of the first frame is received on an auxiliary channel between the first device and the second device, and the method 700 may further include receiving the encoded video stream for the live video on a main channel between the first device and the second device.

Further still, the method 700 may further include receiving at the second device a reduced resolution encoded video stream of the live video for display as a picture-in-picture in an image of the first sequence of encoded video frames of the first frame.

As described herein, the first sequence of encoded video frames of the first frame comprises encoded video frames encoded with a progressively reduced quantization parameter or encoded with an adjusted a number of pixels-per-frame to achieve the progressively higher fidelity.

According to yet further aspects, as depicted in FIGS. 5A and 5B, the method 700 may further include: generating a second freeze-frame request indicating that the user of the second device requests a high-fidelity freeze-frame of a second frame of the encoded video stream from the first device, the second frame corresponding to one of a plurality of raw video frames stored in a circular buffer of the first device; receiving from the second device a second sequence of encoded video frames of the second frame, each encoded video frame of the second sequence being of progressively higher fidelity of the second frame; and decoding the second sequence of encoded video frames for display of the second frame with progressively higher fidelity.

Referring to FIG. 8, a hardware block diagram is provided of a computing device 800 that may perform functions associated with operations described herein in connection with the FIGS. 1-7. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, certain video applications, such as telemedicine, need high-fidelity freeze-frame to examine critical detail in real-time videoconferencing. Techniques are provided by which a receiver of a video stream signals to the sender to freeze the video input at a certain frame, and the sender responds by adapting its encoding methods to progressively improve the quality of the sent static image, until it is of superior fidelity to the equivalent frame sent as part of a high-frame rate sequence.

In one form, a method is provided comprising, at a first device that is sharing with at least a second device, an encoded video stream for live video captured at the first device: receiving a first freeze-frame request initiated by the second device, the first freeze-frame request indicating that a user of the second device requests a high-fidelity freeze-frame of a first frame of the encoded video stream from the first device; and generating, with the video encoding process, a first sequence of encoded video frames of the first frame that is requested for a high-fidelity freeze-frame, each encoded video frame of the first sequence being of progressively higher fidelity of the first frame.

In another form, a method is provided comprising, at a second device that is receiving an encoded video stream for live video captured at a first device: generating a first freeze-frame request indicating that a user of the second device requests a high-fidelity freeze-frame of a first frame the encoded video stream from the first device; sending the first freeze-frame request to the first device; receiving a first sequence of encoded video frames of the first frame, each encoded video frame of the first sequence being of progressively higher fidelity of the first frame; and decoding the first sequence of encoded video frames for display of the first frame with progressively higher fidelity.

In still another form, an apparatus is provided comprising: a communication interface configured to enable network communications on behalf of a first device that is sharing live video with at least a second device; a video camera configured to capture the live video; an encoder configured to encode video captured by the video camera to produce an encoded video stream; a controller coupled to the encoder, wherein the controller is configured to: receive a first freeze-frame request initiated by the second device, the first freeze-frame request indicating that a user of the second device requests a high-fidelity freeze-frame of a first frame of the encoded video stream from the first device; and control the encoder to generate a first sequence of encoded video frames of the first frame that is requested for a high-fidelity freeze-frame, each encoded video frame of the first sequence being of progressively higher fidelity of the first frame.

In still another form, an apparatus is provided comprising a communication interface configured to enable network communications on behalf of a second device that is receiving an encoded video stream for live video captured at a first device; a decoder configured to decode encoded video frames for display; and a controller, wherein the controller is configured to: generate a first freeze-frame request indicating that a user of the second device requests a high-fidelity freeze-frame of a first frame the encoded video stream from the first device; send the first freeze-frame request to the first device; receive a first sequence of encoded video frames of the first frame, each encoded video frame of the first sequence being of progressively higher fidelity of the first frame; and control the decoder to decode the first sequence of encoded video frames for display of the first frame with progressively higher fidelity.

Further still, one or more non-transitory computer readable storage media are provided, encoded with instructions that, when executed by a processor, cause the processor to perform operations including, at a first device that is sharing with at least a second device, an encoded video stream for live video captured at the first device: receiving a first freeze-frame request initiated by the second device, the first freeze-frame request indicating that a user of the second device requests a high-fidelity freeze-frame of a first frame of the encoded video stream from the first device; and generating, with the video encoding process, a first sequence of encoded video frames of the first frame that is requested for a high-fidelity freeze-frame, each encoded video frame of the first sequence being of progressively higher fidelity of the first frame.

Further, one or more non-transitory computer readable storage media are provided, encoded with instructions that, when executed by a processor, cause the processor to perform operations including, at a second device that is receiving an encoded video stream for live video captured at a first device: generating a first freeze-frame request indicating that a user of the second device requests a high-fidelity freeze-frame of a first frame the encoded video stream from the first device; sending the first freeze-frame request to the first device; receiving a first sequence of encoded video frames of the first frame, each encoded video frame of the first sequence being of progressively higher fidelity of the first frame; and decoding the first sequence of encoded video frames for display of the first frame with progressively higher fidelity.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a first device that is sharing with at least a second device, an encoded video stream for live video captured at the first device:
   receiving a first freeze-frame request initiated by the second device, the first freeze-frame request indicating that a user of the second device requests a high-fidelity freeze-frame of a first frame of the encoded video stream from the first device;
   in response to the first freeze-frame request, stopping input of video to a video encoding process that is used to produce the encoded video stream at the first device; and
   generating, with the video encoding process, a first sequence of encoded video frames of the first frame that is requested for a high-fidelity freeze-frame, each encoded video frame of the first sequence being of progressively higher fidelity of the first frame.

2. The method of claim 1, further comprising:
   receiving an end-freeze request indicating that the user of the second device requests to end the high-fidelity freeze-frame of the first frame and resume receiving the encoded video stream from the first device; and
   in response to the end-freeze request, supplying the video to the video encoding process to produce the encoded video stream at the first device.

3. The method of claim 1, further comprising:
   transmitting the first sequence of encoded video frames of the first frame to the second device as part of a point-to-point video communication session between the first device and the second device.

4. The method of claim 3, wherein transmitting the first sequence of encoded video frames of the first frame is made on an auxiliary channel between the first device and the second device, and further comprising:
   transmitting the encoded video stream for the live video on a main channel between the first device and the second device.

5. The method of claim 1, further comprising:
   transmitting the first sequence of encoded video frames of the first frame to a video bridge that forwards the first sequence of encoded video frames of the first frame to the second device as part of a video conference session.

6. The method of claim 5, further comprising:
   generating, with the video encoding process, a reduced resolution encoded video stream of the live video at the first device; and
   transmitting the reduced resolution encoded video stream of the live video to the video bridge, which in turn forwards the reduced resolution encoded video stream to the second device for display as a picture-in-picture in an image of the first sequence of encoded video frames of the first frame.

7. The method of claim 6, further comprising:
simultaneously with transmitting the first sequence of encoded video frames of the first frame and transmitting the reduced resolution encoded video stream, transmitting to the video bridge the encoded video stream of the live video at the first device, wherein the video bridge forwards the encoded video stream of the live video to one or more other devices that are participating in the video conference session.

8. The method of claim 5, further comprising:
simultaneously with transmitting the first sequence of encoded video frames of the first frame, transmitting to the video bridge the encoded video stream for the live video, wherein the video bridge transcodes the encoded video stream for the live video into one or more transcoded video streams, each of a different encoding type, for forwarding to one or more other devices that are participating in the video conference session.

9. The method of claim 1, wherein generating the first sequence of encoded video frames of the first frame comprises progressively reducing a quantization parameter value for each encoded video frame of the first sequence of encoded video frames encoded by the video encoding process.

10. The method of claim 1, wherein generating the first sequence of encoded video frames of the first frame comprises adjusting a number of pixels-per-frame for the encoded video frames of the first sequence to achieve the progressively higher fidelity.

11. The method of claim 1, further comprising:
storing at the first device in a circular buffer raw video frames of the live video;
receiving a second freeze-frame request initiated by the second device, the second freeze-frame request indicating that the user of the second device requests a high-fidelity freeze-frame of a second frame of the encoded video stream from the first device;
in response to the second freeze-frame request, stopping the generating of the first sequence of encoded video frames of the first frame;
retrieving from the circular buffer a raw video frame corresponding to the second frame of the second freeze-frame request; and
generating, with the video encoding process, a second sequence of encoded video frames of the second frame that is requested for a high-fidelity freeze frame, each encoded video frame of the second sequence being of progressively higher fidelity of the second frame.

12. A method comprising:
at a second device that is receiving an encoded video stream for live video captured at a first device:
generating a first freeze-frame request indicating that a user of the second device requests a high-fidelity freeze-frame of a first frame of the encoded video stream from the first device;
sending the first freeze-frame request to the first device, wherein the first freeze-frame request causes the first device to stop input of video to a video encoding process that is used to produce the encoded video stream at the first device;
receiving a first sequence of encoded video frames of the first frame, each encoded video frame of the first sequence being of progressively higher fidelity of the first frame; and
decoding the first sequence of encoded video frames for display of the first frame with progressively higher fidelity.

13. The method of claim 12, further comprising:
generating an end-freeze request indicating that the user of the second device requests to end the high-fidelity freeze-frame of the first frame and resume receiving the encoded video stream from the first device; and
sending the end-freeze request to the first device.

14. The method of claim 12, wherein the first sequence of encoded video frames of the first frame is received on an auxiliary channel between the first device and the second device, and further comprising:
receiving the encoded video stream for the live video on a main channel between the first device and the second device.

15. The method of claim 12, further comprising:
receiving at the second device a reduced resolution encoded video stream of the live video for display as a picture-in-picture in an image of the first sequence of encoded video frames of the first frame.

16. The method of claim 12, wherein the first sequence of encoded video frames of the first frame comprises encoded video frames encoded with a progressively reduced quantization parameter or encoded with an adjusted a number of pixels-per-frame to achieve the progressively higher fidelity.

17. The method of claim 12, further comprising:
generating a second freeze-frame request indicating that the user of the second device requests a high-fidelity freeze-frame of a second frame of the encoded video stream from the first device, the second frame corresponding to one of a plurality of raw video frames stored in a circular buffer of the first device;
receiving from the second device a second sequence of encoded video frames of the second frame, each encoded video frame of the second sequence being of progressively higher fidelity of the second frame; and
decoding the second sequence of encoded video frames for display of the second frame with progressively higher fidelity.

18. An apparatus comprising:
a communication interface configured to enable network communications on behalf of a first device that is sharing live video with at least a second device;
a video camera configured to capture the live video;
an encoder configured to encode video captured by the video camera to produce an encoded video stream; and
a controller coupled to the encoder, wherein the controller is configured to:
receive a first freeze-frame request initiated by the second device, the first freeze-frame request indicating that a user of the second device requests a high-fidelity freeze-frame of a first frame of the encoded video stream from the first device;
in response to the first freeze-frame request, stop input of video to the encoder that is used to produce the encoded video stream; and
control the encoder to generate a first sequence of encoded video frames of the first frame that is requested for a high-fidelity freeze-frame, each encoded video frame of the first sequence being of progressively higher fidelity of the first frame.

19. The apparatus of claim 18, further comprising:
a circular buffer configured to store raw video frames of the live video;
wherein the controller is further configured to:
receive a second freeze-frame request initiated by the second device, the second freeze-frame request indicating that the user of the second device requests a high-fidelity freeze-frame of a second frame of the encoded video stream from the first device;

in response to the second freeze-frame request, control the encoder to stop generating the first sequence of encoded video frames of the first frame;

retrieve from the circular buffer a raw video frame corresponding to the second frame of the second freeze-frame request; and control the encoder to encode a second sequence of encoded video frames of the second frame that is requested for a high-fidelity freeze frame, each encoded video frame of the second sequence being of progressively higher fidelity of the second frame.

20. The apparatus of claim 18, wherein the controller is further configured to:

receive an end-freeze request indicating that the user of the second device requests to end the high-fidelity freeze-frame of the first frame and resume receiving the encoded video stream from the first device; and in response to the end-freeze request, supply the video to the encoder to produce the encoded video stream at the first device.

* * * * *